United States Patent
Pires et al.

(10) Patent No.: US 12,248,218 B2
(45) Date of Patent: Mar. 11, 2025

(54) PHOTO-ALIGNABLE POSITIVE C-PLATE RETARDER

(71) Applicant: ROLIC TECHNOLOGIES AG, Allschwil (CH)

(72) Inventors: David Pires, Giebenach (CH); Richard Frantz, Village-Neuf (FR)

(73) Assignee: ROLIC TECHNOLOGIES AG, Allschwil (CH)

( * ) Notice: Subject to any disclaimer, the term of this patent is extended or adjusted under 35 U.S.C. 154(b) by 270 days.

(21) Appl. No.: 17/597,446

(22) PCT Filed: Jul. 20, 2020

(86) PCT No.: PCT/EP2020/070414
§ 371 (c)(1),
(2) Date: Jan. 6, 2022

(87) PCT Pub. No.: WO2021/013780
PCT Pub. Date: Jan. 28, 2021

(65) Prior Publication Data
US 2022/0163853 A1 May 26, 2022

(30) Foreign Application Priority Data
Jul. 24, 2019 (EP) .................... 19188062

(51) Int. Cl.
G02F 1/13363 (2006.01)
G02F 1/1337 (2006.01)

(52) U.S. Cl.
CPC .. *G02F 1/133634* (2013.01); *G02F 1/133788* (2013.01)

(58) Field of Classification Search
CPC .......... G02F 1/13363; G02F 1/133634; G02F 1/133788
USPC .......................................... 349/117
See application file for complete search history.

(56) References Cited

U.S. PATENT DOCUMENTS

| | | |
|---|---|---|
| 4,122,027 A | 10/1978 | Cole, Jr. et al. |
| 4,401,369 A | 8/1983 | Jones |
| 4,565,424 A | 1/1986 | Huffman et al. |
| 4,667,020 A | 5/1987 | Etzbach et al. |

(Continued)

FOREIGN PATENT DOCUMENTS

| | | |
|---|---|---|
| JP | 2012-255926 A | 12/2012 |
| JP | 2016-4142 A | 1/2016 |

(Continued)

OTHER PUBLICATIONS

International Search Report dated Oct. 14, 2020 in International Application No. PCT/EP2020/070414.

(Continued)

*Primary Examiner* — Dung T Nguyen
*Assistant Examiner* — David Y Chung
(74) *Attorney, Agent, or Firm* — Sughrue Mion, PLLC

(57) ABSTRACT

The present invention relates to material compositions and methods for generating photo-alignable positive c-plate retarders. Because a planar alignment direction can be induced in the surface of the above c-plate retarder by exposure to polarized light, a slave material can be aligned on the surface of the c-plate retarder with a defined azimuthal orientation direction, without the need of an additional orientation layer.

17 Claims, 1 Drawing Sheet

(56) References Cited

U.S. PATENT DOCUMENTS

| | | |
|---|---|---|
| 5,389,285 A | 2/1995 | Shannon et al. |
| 5,539,074 A | 7/1996 | Herr et al. |
| 5,650,534 A | 7/1997 | Kelly et al. |
| 5,700,393 A | 12/1997 | Kelly |
| 5,851,424 A | 12/1998 | Kelly |
| 5,995,184 A | 11/1999 | Chung et al. |
| 6,107,427 A | 8/2000 | Herr et al. |
| 6,201,087 B1 | 3/2001 | Herr et al. |
| 6,395,351 B1 | 5/2002 | Benecke et al. |
| 6,632,909 B2 | 10/2003 | Buchecker et al. |
| 6,717,644 B2 | 4/2004 | Schadt et al. |
| 6,733,690 B1 | 5/2004 | Lukac et al. |
| 6,746,729 B1 | 6/2004 | Cherkaoui et al. |
| 7,959,990 B2 | 6/2011 | Cherkaoui et al. |
| 8,173,749 B2 | 5/2012 | Bachels et al. |
| 9,097,938 B2 | 8/2015 | Eckert et al. |
| 2004/0164272 A1 | 8/2004 | Buchecker et al. |
| 2005/0151906 A1* | 7/2005 | Yoshimi ............... G02B 5/3016 349/117 |
| 2006/0250555 A1* | 11/2006 | Suemasu ............. G02F 1/13363 349/117 |
| 2008/0170294 A1 | 7/2008 | Kuroda et al. |
| 2011/0065859 A1 | 3/2011 | Bury et al. |
| 2012/0314159 A1 | 12/2012 | Sakai |
| 2012/0316317 A1 | 12/2012 | Eckert et al. |
| 2015/0277006 A1 | 10/2015 | Takasago et al. |
| 2016/0083655 A1 | 3/2016 | Pires et al. |
| 2016/0271894 A1 | 9/2016 | Tang et al. |
| 2019/0384086 A1* | 12/2019 | Lan ....................... C01B 32/194 |

FOREIGN PATENT DOCUMENTS

| | | |
|---|---|---|
| WO | 99/37735 A1 | 7/1999 |
| WO | 00/04110 A1 | 1/2000 |
| WO | 00/05189 A1 | 2/2000 |
| WO | 00/07975 A1 | 2/2000 |
| WO | 00/48985 A1 | 8/2000 |
| WO | 03/027056 A1 | 4/2003 |
| WO | 2004/085547 A1 | 10/2004 |
| WO | 2005/054406 A1 | 6/2005 |
| WO | 2005/105932 A1 | 11/2005 |
| WO | 2008/052376 A1 | 5/2008 |
| WO | 2009/080271 A1 | 7/2009 |
| WO | 2015/177062 A1 | 11/2015 |
| WO | WO-2018019691 A1 * | 2/2018 ........... G02B 5/3016 |
| WO | 2019/030292 A1 | 2/2019 |

OTHER PUBLICATIONS

Written Opinion of the International Searching Authority dated Oct. 14, 2020 in International Application No. PCT/EP2020/070414.

* cited by examiner

PHOTO-ALIGNABLE POSITIVE C-PLATE RETARDER

CROSS REFERENCE TO RELATED APPLICATIONS

This application is a National Stage of International Application No. PCT/EP2020/070414 filed Jul. 20, 2020, claiming priority based on European Patent Application Ser. No. 19/188,062.4 filed Jul. 24, 2019.

TECHNICAL FIELD

The invention relates to a positive c-plate retarder which is photo-alignable as well as to layer architectures comprising non-vertically aligned liquid crystal layers in contact with such c-plate retarder. The invention further relates to methods of generating photo-alignable positive c-plate retarders as well as to materials suitable for photo-alignable positive c-plate retarders.

BACKGROUND OF THE INVENTION

Photo-alignment has become a powerful alignment method in the production of liquid crystal displays (LCD) and optical retarder films for various applications.

In case of optical retarder films, liquid crystal monomers are applied on top of a photo-alignment layer. After the alignment information of the photo-alignment layer has been transferred to the liquid crystal monomers, the monomers are polymerized and/or cross-linked in order to solidify the liquid crystal material. Polymerized and/or crosslinked liquid crystal monomers are also known as liquid crystal polymers (LCP).

U.S. Pat. No. 6,717,644B2 discloses stacks of LCP layers which have individual optical axis directions. Each of the LCP layers is aligned by an alignment layer, such as a photo-alignment layer. Because of this, the total number of layers in a stack of LCP layers is at least twice the number of LCP layers. Stacking of LCP layers with individual optical axis directions can, for example, be used to generate interference color filters, such as Solc filters.

WO2018/019691 discloses a method of generating alignment on the surface of a material comprising a liquid crystal polymer material and a photo-orientable substance. Using this method, separate alignment layers for aligning second or further LCP layers are not required and hence the number of layers in multilayer optical films can be reduced. The above patent application mentions layer structures with planar retarders and polarizers comprising liquid crystal polymers, which are, for example, designed to act as an achromatic circular polarizer for antireflection structures in OLED displays. Other examples mentioned are interference color filters, such as Solc or Lyot filters.

U.S. Pat. No. 5,995,184 discloses a method of lowering the intrinsic tilt angle in a layer of polymerizable liquid crystals at the air interface side by adding surface active chemicals, which lower the surface energy. The tilt angle may be reduced down to zero degree in order to realize planar liquid crystal alignment.

Planar retarders suffer from a strong dependency of the retardance from the incidence angle of the light. Therefore, there is a strong demand for retarder film structures which in addition to one or more planar retarders include a positive c-plate retarder, which optically compensates the angular dependency of the planar retarders.

C-plate retarders are uniaxial retarders where the axis of the extraordinary refractive index (ne) is perpendicular to the plane of the retarder. If in a c-plate retarder the extraordinary refractive index is larger than the ordinary index of refraction (no) the c-plate retarder is called a positive c-plate retarder, contrary to a negative c-plate retarder, wherein the extraordinary refractive index is lower than the ordinary refractive index.

Similarly to planar retarder layers, positive c-plate retarders are also used for reducing viewing angle dependencies in LCDs with planar liquid crystal alignment, such as LCDs designed for IPS or FFS mode. Positive c-plate retarders can also help to decrease the angular dependency of liquid crystal layers, such as retarder layers, wherein the optical axis is tilted, with regard to a substrate surface.

It would be desirable to have methods and materials available which allow to produce layer structures including a positive c-plate retarder in an efficient way, for example, by reducing the number of layers and production steps compared to the state of the art methods.

SUMMARY OF THE INVENTION

An object of the present invention is therefore to provide a method and related materials to simplify production of devices containing a positive c-plate retarder in combination with planar or tilted liquid crystal layers, such as retarders.

In the method according to the invention a positive c-plate retarder layer is formed from a composition comprising polymerizable liquid crystals and one or more photo-orientable substances. The resulting retarder layer has the property that upon exposure to aligning light the surface develops planar or tilted alignment capability for alignable materials, such as liquid crystal materials.

Because the c-plate retarder itself has no preferred azimuthal component, it is not required to provide an azimuthal alignment direction for manufacturing the c-plate retarder. It is only required that the substrate to which the liquid crystalline c-plate material is applied supports development of homeotropic orientation of the liquid crystals in the c-plate retarder material.

In addition to the interaction with the substrate, it is also required that the liquid crystal-air interaction at the upper surface of the liquid crystal layer supports homeotropic orientation. A proper balance of surface energies in the liquid crystal c-plate material is therefore critical.

For the purpose of easier reading, the abbreviation PAPC is used for the term "photo-alignable positive C-plate".

In the context of this application, a PAPC material shall mean a composition comprising homeotropically alignable, polymerizable liquid crystals and a photo-orientable substance. Accordingly, a PAPC layer is a layer formed from a PAPC material.

Preferably, the photo-orientable substance has the property to develop planar or tilted alignment capability for a slave material upon exposure to aligning light.

In case a state of the art positive c-plate retarder is formed from a material comprising polymerizable liquid crystals but not a photo-orientable substance, the c-plate retarder will not be able to provide a preferred azimuthal aligning direction for a liquid crystal on its surface. Moreover, because the liquid crystal molecules in the c-plate retarder are aligned homeotropic, which means perpendicular to the substrate surface, the surface of the c-plate retarder may provide homeotropic alignment for a liquid crystal layer.

As mentioned above, U.S. Pat. No. 5,995,184 discloses that in a layer of polymerizable liquid crystals the intrinsic tilt angle at the air interface side is lowered by adding surface active chemicals, which lower the surface energy. A skilled person would therefore expect that it is hardly possible to maintain the potential of liquid crystal materials to align homeotropically when substances that migrate to the surface are added.

Alignment layers for liquid crystals have to provide the alignment information at the surface of the layer which is in contact with the liquid crystals. Accordingly, at least part of the photo-orientable substance in a PAPC layer, has to migrate to the surface of the air interface of the PAPC layer. Because the photo-orientable substances in a PAPC material are designed for planar or tilted orientation, a person skilled in the art would expect that due to the photo-alignable substances at the upper surface, the intrinsic tilt of the liquid crystal molecules at the air interface will be reduced and therefore homeotropic liquid crystal orientation may no longer be possible, especially if the surface energies of liquid crystal material and photo-alignable substance are different from each other.

PAPC layers according to the invention exhibit homeotropic orientation of the liquid crystals although photoalignable substances are included in the PAPC composition.

In PAPC layers according to the invention a preferred azimuthal orientation direction for liquid crystals can be induced in the surface of a PAPC layer by exposure to aligning light, which is due to the presence of the photo-orientable substance at the PAPC layer surface. This preferred azimuthal orientation direction in the surface of a PAPC layer can be transferred to a slave material, such as a liquid crystal material deposited on top of the PAPC layer. Surprisingly, the alignment generated by the aligning light dominates even over the strong alignment forces induced by the homeotropically aligned liquid crystals in the PAPC layer.

Polymerization of the liquid crystal material in the PAPC layer can, for example, be initiated by exposure to non-polarized actinic light prior to, simultaneously with or after the exposure to aligning light. Preferably, the PAPC material is designed such that the wavelength sensitivity of the polymerizable liquid crystal material and of the photo-orientable substances are different and hence polymerization of the liquid crystal material can be initiated by light of a different wavelength than that required for the generation of the photo-alignment by the aligning light. Preferably, the PAPC material comprises a photo-initiator.

On the other hand, the PAPC material may be designed such that for a certain light spectrum of the aligning light a single exposure to aligning light simultaneously initiates polymerization of the liquid crystal material and generation of orientation of the photo-orientable substance. By proper selection of material and exposure parameters, it is possible to rapidly solidify the liquid crystal material in the homeotropic configuration before the aligning forces due to the photo-alignment reaction induced by the aligning light are strong enough to deform the liquid crystal configuration.

It is even possible to maintain the homeotropic configuration of the polymerizable liquid crystals if the PAPC layer is exposed to aligning light before the liquid crystals are polymerized. In this case the viscosity of the PAPC material should be high enough to prevent the liquid crystal molecules from tilting away from the vertical orientation. For this purpose it is helpful to keep the temperature of the PAPC material from the time at which exposure to aligning light starts until the liquid crystals are polymerized well below the clearing temperature of the PAPC material.

A PAPC material may contain a solvent. The solvent may be helpful for preparing and storing the composition as well as for proper adjustment of the viscosity for optimum printing and/or coating performance. Solvents are typically removed, for example by heating, after the PAPC material has been deposited on a support. A PAPC material without a solvent should have a liquid crystalline phase, preferably the PAPC material without a solvent is in a liquid crystal phase at about room temperature. In the following, the clearing temperature of the PAPC material shall mean the clearing temperature of the PAPC material from which such solvents have been removed.

In a preferred embodiment, a PAPC material comprises one or more dichroic dyes, which absorb light at least in one wavelength range in the visible spectrum of the light. A layer of such a PAPC material, wherein the liquid crystal molecules are aligned homeotropically will then act as a linear polarizer with the symmetry axis along the axis vertical to the substrate surface.

The relative terms "upper" and "lower" used in combination with a layer as well as the surface of a layer are defined with regard to the position of the support. Accordingly, the lower part of a layer is facing the support, whereas the upper side or the upper surface, respectively, is facing away from the support.

A PAPC layer applied and treated according to the method of the invention, has an optical function which is determined by the liquid crystal material and its configuration as well as by optional dichroic dyes included in the PAPC material.

Within the context of the present application the terms "polymerizable" and "polymerized" shall include the meaning of "cross-linkable" and "cross-linked", respectively. Likewise, "polymerization" shall include the meaning of "cross-linking".

In the context of the present application, a "photo-orientable substance" is a material in which anisotropic properties can be induced upon exposure to aligning light. In addition, the term "photo-oriented substance" is used to refer to a photo-orientable substance that has been aligned by exposure to aligning light. For the present invention the induced anisotropy must be such, that it provides alignment capability for a slave material, in particular for a liquid crystal material. The term "alignment direction" shall refer to the preferred direction that is induced in the slave material. For example, if the slave material is a liquid crystal material, the alignment direction is the direction in which the liquid crystal molecules would be aligned.

In the context of the present application, the term "aligning light" shall mean light, which can induce anisotropy in a photo-orientable substance and which is at least partially linearly or elliptically polarized and/or is incident to the surface of a photo-orientable substance from an oblique direction. Preferably, the aligning light is linearly polarized with a degree of polarization of more than 5:1. Wavelengths, intensity and energy of the aligning light are chosen depending on the photosensitivity of the photo-orientable substance. Typically, the wavelengths are in the UV-A, UV-B and/or UV-C range or in the visible range. Preferably, the aligning light comprises light of wavelengths less than 450 nm. More preferred is that the aligning light comprises light of wavelengths less than 420 nm.

If the aligning light is linearly polarized, the polarization plane of the aligning light shall mean the plane defined by the propagation direction and the polarization direction of the aligning light. In case the aligning light is elliptically polarized, the polarization plane shall mean the plane defined by the propagation direction of the light and by the major axis of the polarization ellipse.

The terms photo-alignment, photo-alignable and photo-aligned are used synonymously with the terms photo-orientation, photo-orientable and photo-oriented, respectively.

BRIEF DESCRIPTION OF THE DRAWINGS

The invention is further illustrated by the accompanying drawing figures. It is emphasized that the various features are not necessarily drawn to scale.

DETAILED DESCRIPTION OF THE INVENTION

Figure 1:
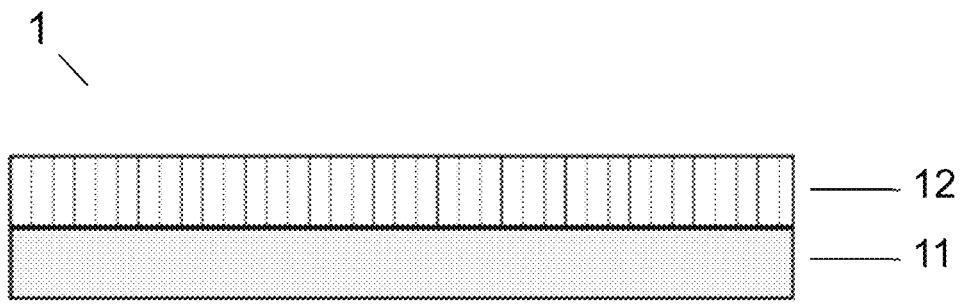
FIG. 1 depicts a PAPC layer, which acts as a positive c-plate retarder and provides alignment for a slave material.

According to a first aspect of the invention there is provided a method for manufacturing a stack of aligned LCP layers.

The method of the invention comprises the steps of
providing a composition comprising homeotropically alignable, polymerizable liquid crystals and a photo-orientable substance (PAPC material)
forming on a support a layer of the PAPC material, wherein the liquid crystal molecules are homeotropically oriented
initiate polymerization of the polymerizable liquid crystals in the PAPC layer
exposing the PAPC layer to aligning light to generate alignment on the upper surface of the layer for a slave material, wherein the generated alignment direction at least in one area of the upper surface is planar or tilted with regard to the PAPC layer surface.

The term "support" in the phrase "on a support" shall include the meaning of a substrate.

The steps of polymerizing the polymerizable liquid crystals and exposure to aligning light may be in any sequence. Polymerization may be initiated before or after exposure to aligning light. In a special embodiment of the method, polymerization and generation of alignment is achieved in a single step of exposure to aligning light. In any case care has to be taken that the liquid crystals maintain their homeotropic configuration during exposure to aligning light. Preferably, this is done by polymerizing the liquid crystals before exposing the PAPC layer to aligning light.

If the PAPC layer is exposed to aligning light before the liquid crystals are polymerized care has to be taken that the aligning light does not induce a deformation of the homeotropic liquid crystal configuration. For this purpose it is helpful to keep the temperature of the PAPC material from the time of exposure to aligning light until the liquid crystals are polymerized well below the clearing temperature of the PAPC material. Preferably, the temperature of the PAPC material is less than 5° C. or 10° C. below the clearing temperature of the PAPC material from the time of exposure to aligning light until the liquid crystals are polymerized. More preferred is that the temperature of the PAPC material is less than 20° C., 30° C. or 40° C. below the clearing temperature, and most preferred the temperature of the PAPC material is less than 50° C., 60° C. or 70° C. below the clearing temperature. Further preferred is that the temperature of the PAPC material is close to room temperature. In particular preferred is that the temperature is less than 50° C. more preferred less than 40° C. and most preferred less than 30° C.

In a preferred embodiment of the method the aligning light is irradiated from an oblique direction to the surface of the PAPC layer in order to generate a tilted alignment, for example to provide a pretilt angle for liquid crystals.

If the whole area of the PAPC layer is exposed to aligning light, uniaxial alignment results. The aligning light may be shaped such that only part of the PAPC layer is exposed to the aligning light, for example by covering certain areas by photo-masks or by scanning light beams to desired areas only. Subsequent exposure steps may be added with different polarization planes of the aligning light in order to generate an orientation pattern on the PAPC layer. Any other method known to generate an alignment pattern by photo-alignment can be used as well, including exposure to aligning light with spatially modulated polarization plane. As a result, a plurality of orientation directions may be generated in the surface of the PAPC layer. Preferred relative orientation directions are 0°, 45°, 90°, 135° with regard to a reference direction, such as the edge of a substrate. Preferred combinations of orientation directions in different areas are 0° and 45°, 0° and 90°, 45° and 135°, wherein the angles are measured with regard to a reference direction.

The support may be rigid or flexible and can have any form or shape. For example, it may be a body with complex surfaces. In principle it may consist of any material. Preferably, the support comprises plastic, glass or metal or is a silicon wafer. In case the support is flexible, it is preferred that the support is a plastic or metal foil. Preferably, the surface of the support is flat. Preferably, the support is transparent.

The support may be moving during the deposition of the PAPC material. For example, a layer of the PAPC material may be produced in a continuous roll to roll process by depositing the material composition onto a moving flexible foil, which is preferably plastic or metallic.

The support may have additional layers, such as organic, dielectric or metallic layers. The layers can have different functions, for example an organic layer can be coated as a primer layer which increases compatibility of the materials to be coated with the support. Metallic layers may be used as electrodes, for example when used in electrooptical devices such as displays, or could have the function as a reflector. The support may also be an optical element or device which has certain functions, such as a substrate for an LCD, which might, for example, comprise thin film transistors, electrodes or color filters. In another example, the support is a device comprising an OLED layer structure. The support could also be a retarder film, a polarizer, such as a polarizing film or a sheet polarizer, a reflective polarizer, such as the commercially available Vikuity™ DBEF film.

The PAPC layer may be applied to the support by any suitable method like, extruding, casting, molding, 2D- or 3D-printing or coating. Suitable coating methods are, for example: spin-coating, blade coating, knife coating, kiss roll coating, die coating, dipping, brushing, casting with a bar, roller-coating, flow-coating, wire-coating, spray-coating, dip-coating, curtain-coating, air knife coating, reverse roll coating, gravure coating, metering rod (Meyer bar) coating, slot die (Extrusion) coating, roller coating, flexo coating. Suitable printing methods include: silk screen printing, relief printing such as flexographic printing, jet printing, intaglio printing such as direct gravure printing or offset gravure printing, lithographic printing such as offset printing, or stencil printing such as screen printing.

A layer of a PAPC material does not have to cover the full surface of a support. Rather than that, the layer may be applied in the form of a pattern, for example by printing, or may after deposition be treated to have the form of a pattern, for example by photo-lithographic methods.

Because the main purpose of the photo-orientable substance in a PAPC layer is to generate alignment at the upper surface of a PAPC layer, it is not required that the photo-orientable substance is equally distributed along the thickness direction of the layer. Therefore, the ratio of the amounts of photo-orientable substance to that of the other compound(s) preferably varies along the thickness direction of the layer, which means that there is a concentration gradient of the photo-orientable substance along the thickness direction. Preferably, the concentration of photo-orientable substance is higher at the upper surface of the PAPC layer than in the middle of the layer. More preferred, the photo-orientable substance and the polymerizable liquid crystals are phase separated. Preferably, the phase separated photo-orientable substance is arranged as a layer above and/or below the polymerizable liquid crystals.

Because the liquid crystal molecules in a positive c-plate retarder are oriented vertical to the support layer, a preferred azimuthal orientation direction does not have to be provided by an alignment layer or other orientation means. It is sufficient that the interaction of the surface of the support and the PAPC material is such that the orientation is homeotropic. The support may already provide such property without further treatment. Alternatively, a thin layer of a material may be coated on the support which is especially designed to support homeotropic orientation of the liquid crystals in the PAPC layer. In any case it may be helpful to increase the temperature of a PAPC layer after deposition of the PAPC material.

In addition to any of the above variants, the method of the invention may comprise the step of applying a slave material on top of the aligned surface of the PAPC layer.

In the context of the present application, a "slave material" shall refer to any material that has the capability to establish anisotropy upon contact with a photo-oriented material.

The terms "anisotropic" and "anisotropy" may, for example, refer to the optical absorption, the birefringence, the electrical conductivity, the molecular orientation, the property for alignment of other materials, for example for liquid crystals, or mechanical properties, such as the elasticity modulus. For example, if the slave material exhibits light absorption anisotropy for visible light it can act as a linear polarizer. The term "alignment direction" shall refer to the symmetry axis of the anisotropic property.

A slave material may comprise polymerizable and/or non-polymerizable compounds.

The slave material may be applied by coating and/or printing with or without solvent and may be applied over the full area of the PAPC layer or only on parts of it. Preferably, the method involves heating the slave material before or after applying it to the PAPC layer. The method may also comprise initiating polymerization in the slave material by thermal treatment or exposure to actinic light. Depending on the nature of the slave material, it may be helpful to perform the polymerization under inert atmosphere, such as nitrogen, or under vacuum. The slave material may contain isotropic or anisotropic dyes and/or fluorescent dyes.

Preferably, the slave material is a self-organizing material. More preferred is that the slave material is a liquid crystal material and in particular preferred is that the slave material is a liquid crystal polymer (LCP) material.

A liquid crystal polymer (LCP) material as used within the context of this application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material, for example due to contact with an aligning layer. Polymerization may be initiated by thermal treatment or by exposure to actinic light, which preferably comprises uv-light. A LCP-material may comprise only a single type of liquid crystal compound, but may also comprise additional polymerizable and/or non-polymerizable compounds, wherein not all of the compounds have to be liquid crystal compounds. Further, an LCP material may contain additives, including but not limited to a photo-initiator, an inhibitor, a chiral additive, isotropic or anisotropic fluorescent and/or non-fluorescent dyes, in particular dichroic dyes.

Suitable liquid crystal monomers or pre-polymers are for example disclosed in WO2005/105932, WO2005/054406, WO2004/085547, WO2003/027056, US2004/0164272, U.S. Pat. Nos. 6,746,729, 6,733,690, WO2000/48985, WO2000/07975, WO2000/04110, WO2000/05189, WO99/37735, U.S. Pat. Nos. 6,395,351, 5,700,393, 5,851,424 and 5,650,534. Preferred liquid crystal monomers or pre-polymers have polymerizable groups, which are acrylate or diacrylate, methacrylate, dimethacrylate, allyl, vinyl or acrylamide.

According to a second aspect of the invention there is provided a PAPC material composition comprising polymerizable liquid crystals and one or more photo-orientable substances for use in the methods and devices according to the invention.

The PAPC material may comprise more than one type of photo-orientable substance.

The PAPC material may further contain a photo-initiator and/or an inhibitor, a light stabilizer, isotropic or anisotropic fluorescent and/or non-fluorescent dyes, dichroic dyes and/or chiral additives as well as other additives for improving rheological properties or adhesion.

Preferred are PAPC materials in which the weight ratio of the sum of the photo-orientable substances to the sum of the polymerizable liquid crystals is less than 0.5, more preferable less than 0.2 and most preferred less than 0.1. Depending on the thickness of a PAPC layer, the percentage by weight of photo-orientable substances in the PAPC material may be less than 5%, less than 1 wt % or even less than 0.1 wt % with regard to the composition without solvents. In extreme cases 0.01 wt % of photo-orientable substance with regard to the composition without solvents is enough to still achieve sufficient alignment properties. Preferably, the photo-orientable substance comprises fluorinated and/or siloxane moieties and/or is a polysiloxane, in order to support phase separation. Preferably, the photo-orientable substance is a polymer and comprises fluorinated moieties in the side chain. Examples of photo-orientable polysiloxanes are disclosed in WO2017/081056. Photo-orientable substances comprising fluorinated moieties can, for example, be found in U.S. Pat. No. 8,173,749 B, US 2011/0065859 A1, US 2012/0316317 A1, U.S. Pat. No. 9,097,938 B2, US 2016/0083655 A1, US 2016/0271894 A1, WO 2019/030292. These patent and patent applications are incorporated by reference with regard to the fluorinated substances. The fluorinated moieties in the examples of above patents and patent applications are mainly part of a side chain of a polymer. Accordingly, those side chains strongly influence phase separation. For the purpose of the present invention other main chain structures may, therefore, be used in combination with the fluorinated side chain structures than the specific main chain structures of the examples in the above listed patents. In a preferred embodiment, a PAPC material comprises two different types of photo-orientable substances, wherein one of them tends to migrate to the upper surface of a PAPC layer and the other tends to migrate to the bottom of the layer.

Preferably a PAPC material comprises the photo-orientable substance PA1, which has been used in the examples below.

In order to support phase separation, the photo-orientable substance and the polymerizable liquid crystal material can be so selected that the monomer dipole moments of the photo-orientable substance and of the liquid crystal molecules are different from each other. The monomer dipole moment shall refer to the dipole moment of a monomer or in case of polymers, oligomers and prepolymers to the dipole moment of monomeric units of such polymers, oligomers and prepolymers, respectively. Preferably, the monomer dipole moments differ by more than 0.5 Debye, more preferably by more than 1 Debye and most preferred by more than 1.5 Debye.

A photo-orientable substance in a PAPC material may be any kind of photo-sensitive material in which anisotropic properties, which provide alignment properties for a slave material can be created upon exposure to aligning light, independent from the photo-reaction mechanism. Therefore, suitable photo-orientable substances are, for example, materials in which upon exposure to aligning light the anisotropy is induced by photo-dimerization, photo-decomposition, trans-cis isomerization or photo-fries rearrangement. Preferred PAPC materials comprise a photo-orientable substance, in which photo-dimerization can be initiated upon exposure to aligning light.

Photo-orientable substances, as those described above, incorporate photo-orientable moieties, which are capable of developing a preferred direction upon exposure to aligning light and thus creating anisotropic properties. Such photo-orientable moieties preferably have anisotropic absorption properties. Typically, such moieties exhibit absorption within the wavelength range from 230 to 500 nm. Preferably, the photo-orientable moieties exhibit absorption of light in the wavelength range from 300 to 450 nm, more preferred are moieties, which exhibit absorption in the wavelength range from 310 to 380 nm.

Preferably the photo-orientable moieties have carbon-carbon, carbon-nitrogen, or nitrogen-nitrogen double bonds.

For example, photo-orientable moieties are substituted or un-substituted azo dyes, anthraquinone, coumarin, mericyanine, 2-phenylazothiazole, 2-phenylazobenzthiazole, stilbene, cyanostilbene, fluorostilbene, cinnamonitrile, chalcone, cinnamate, cyanocinnamate, stilbazolium, 1,4-bis(2-phenylethylenyl)benzene, 4,4'-bis(arylazo)stilbenes, perylene, 4,8-diamino-1,5-naphthoquinone dyes, aryloxycarboxylic derivatives, arylester, N-arylamide, polyimide, diaryl ketones, having a ketone moiety or ketone derivative in conjugation with two aromatic rings, such as for example substituted benzophenones, benzophenone imines, phenylhydrazones, and semicarbazones.

Preparation of the anisotropically absorbing materials listed above are well known as shown, e.g. by Hoffman et al., U.S. Pat. No. 4,565,424, Jones et al., in U.S. Pat. No. 4,401,369, Cole, Jr. et al., in U.S. Pat. No. 4,122,027, Etzbach et al., in U.S. Pat. No. 4,667,020, and Shannon et al., in U.S. Pat. No. 5,389,285.

Preferably, the photo-orientable moieties comprise arylazo, poly(arylazo), stilbene, cyanostilbene, cinnamate or chalcone.

A photo-orientable substance may in particular be a monomer, a oligomer or a polymer. The photo-orientable moieties can, for example, be covalently bonded within the main chain or within a side chain of a polymer or oligomer or they may be part of a monomer or other compounds which are not polymerizable. A photo-orientable substance may further be a copolymer comprising different types of photo-orientable moieties or it may be a copolymer comprising side chains with and without photo-orientable moieties.

Polymers denotes for example to polyacrylate, polymethacrylate, polyimide, polyurethane, polyamic acids, polymaleinimide, poly-2-chloroacrylate, poly-2-phenylacrylate; unsubstituted or with $C_1$-$C_6$alkyl substituted poylacrylamide, polymethacrylamide, poly-2-chloroacrylamide, poly-2-phenylacrylamide, polyether, polyvinylether, polyester, polyvinylester, polystyrene-derivatives, polysiloxane, straight-chain or branched alkyl esters of polyacrylic or polymethacrylic acids; polyphenoxyalkylacrylates, polyphenoxyalkylmethacrylates, polyphenylalkylmeth-acrylates with alkyl residues of 1-20 carbon atoms; polyacrylnitril, polymethacrylnitril, cycloolephinic polymers, polystyrene, poly-4-methylstyrene or mixtures thereof.

A photo-orientable substance may also comprise photo-sensitizers, for example, ketocoumarines and benzophenones.

Further, preferred photo-orientable monomers or oligomers or polymers are described in U.S. Pat. Nos. 5,539,074, 6,201,087, 6,107,427, 6,632,909 and 7,959,990.

According to a third aspect of the invention there are provided stacks of anisotropic layers made by using a method according to the invention as well as related materials.

Structure 1 in FIG. 1 depicts a PAPC layer 12 on a substrate 11 used as a support. The liquid crystals in the PAPC layer are aligned homeotropically such that the PAPC layer forms a positive c-plate retarder. In order to support homeotropic orientation of the liquid crystals, the surface of the substrate may be modified by surface treatment, such as plasma or corona treatment. It is also possible that the substrate comprises a layer of a material which provides appropriate surface energies to cause the liquid crystals of the PAPC layer to orient homeotropically. After cross-linking the liquid crystals in the PAPC layer and exposure to aligning light, which may be done in a single irradiation step, the surface of the PAPC layer provides alignment capability for planar or tilted alignment of a slave material such as a liquid crystal material.

Figure 2:
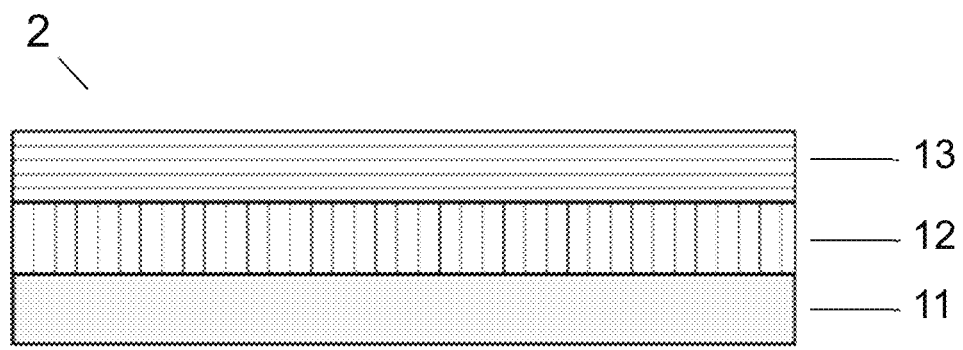
FIG. 2 shows a layer stack in which a layer of a slave material is aligned by a PAPC layer.

In structure 2 in FIG. 2 a layer 13 of a slave material, such as a cross-linkable liquid crystal material, is applied directly to the surface of the PAPC layer. The slave material has been aligned by the photo-aligned surface of PAPC layer 12. Preferably, the slave material comprises an LCP material. An LCP material may further comprise additives such as dichroic dyes and/or chiral additives. Accordingly, layer 13 may be birefringent, can act as a polarizer, may be twisted or may be cholesteric. The LCP molecules in layer 13 may be planar or tilted.

Preferably, layer 13 is birefringent and comprises liquid crystals, which are aligned planar, which means parallel to the surface of layer. In this case structure 2 in FIG. 2 combines a positive c-plate retarder and a planar retarder (a-plate). It is pointed out that this structure can be made with just two layers. Preferably layer 13 acts as a quarter- or halve wave retarder. Especially preferred is that layer 13 is an achromatic retarder.

For most applications, the out of plane retardation Rth of a PAPC layer is lower than −10 nm. Preferably, Rth is lower than −50 nm, more preferred lower than −100 nm.

$$Rth=((n_x+n_y)/2-n_z)\times d,$$

wherein $n_x$, $n_y$ are the refractive indices in the substrate plane, $n_z$ is the refractive index perpendicular to the substrate plane and d is the layer thickness.

For typical materials in the PAPC layer, the thickness of the PAPC layer is larger than 100 nm, preferably larger than 500 nm, more preferred larger than 1 µm. For some applications the thickness of the PAPC layer is larger than 2 µm or even larger than 3 µm.

Layer structures according to the invention can, for example, be used in combination with brightness enhancement films for LCDs, organic light emitting devices (OLED), like displays or OLED lighting applications and as part of antireflection structures for displays.

EXAMPLES
Materials Used in the Examples
Compounds
Photo-Alignment Material PA1
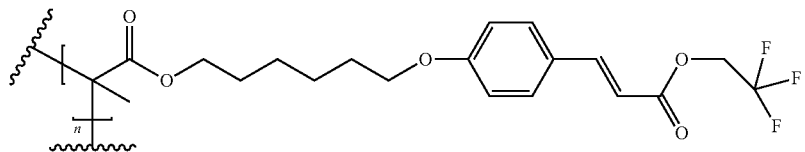
Synthesized as described in patent application WO2019/030292
Liquid Crystal Monomer LCM1
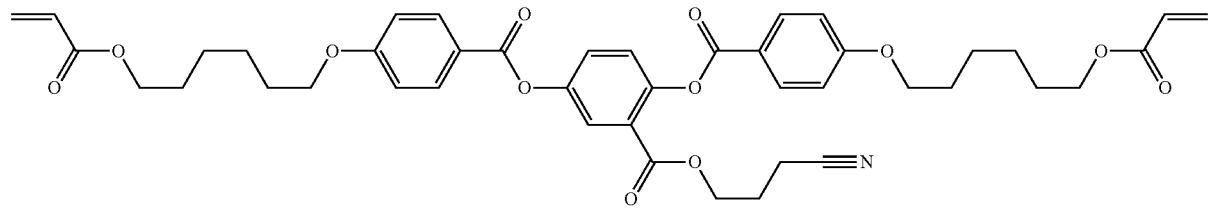 [SMILES: C=CC(=O)OCCCCCCOc1ccc(C(=O)Oc2ccc(OC(=O)c3ccc(OCCCCCCOC(=O)C=C)cc3)c(C(=O)OCCCC#N)c2)cc1]
Liquid Crystal Monomer LCM2
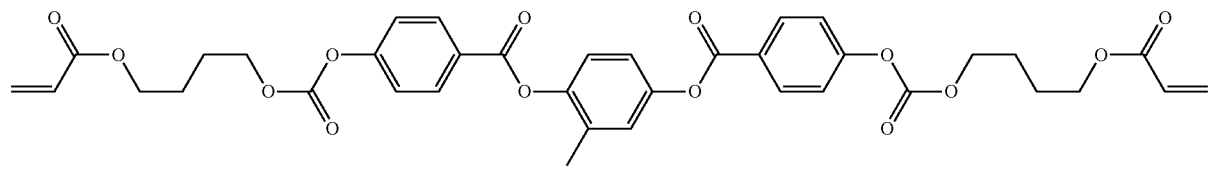 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]
Liquid Crystal Monomer LCM3
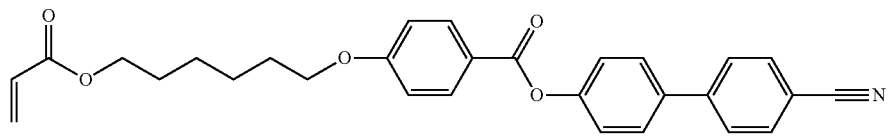 [SMILES: C=CC(=O)OCCCCCCOc1ccc(C(=O)Oc2ccc(-c3ccc(C#N)cc3)cc2)cc1]
Liquid Crystal Monomer LCM4
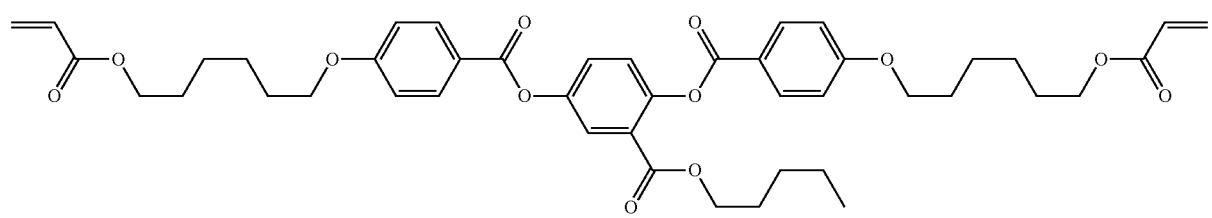 [SMILES: C=CC(=O)OCCCCCCOc1ccc(C(=O)Oc2ccc(OC(=O)c3ccc(OCCCCCCOC(=O)C=C)cc3)c(C(=O)OCCCCC)c2)cc1]

Liquid Crystal Monomer LCM5

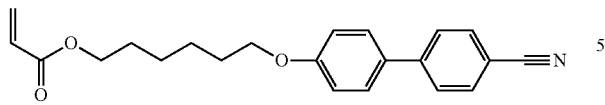

Liquid Crystal Monomer LCM6

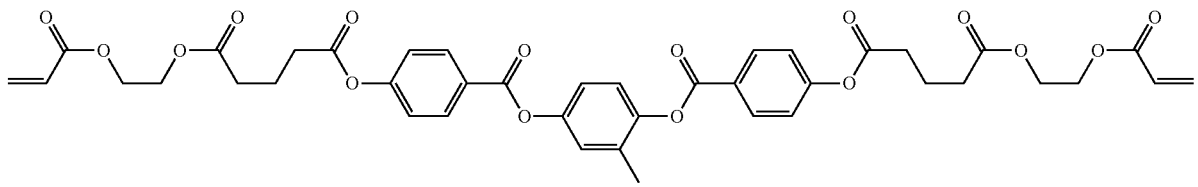 [SMILES: C=CC(=O)OCCOC(=O)CCCC(=O)Oc1ccc(C(=O)Oc2ccc(OC(=O)c3ccc(OC(=O)CCCC(=O)OCCOC(=O)C=C)cc3)c(C)c2)cc1]

Liquid Crystal Monomer LCM7

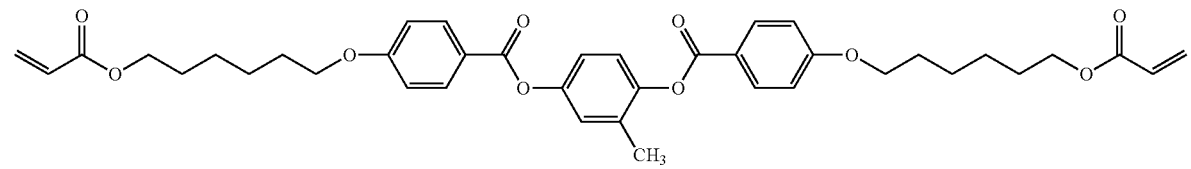 [SMILES: C=CC(=O)OCCCCCCOc1ccc(C(=O)Oc2ccc(OC(=O)c3ccc(OCCCCCCOC(=O)C=C)cc3)c(C)c2)cc1]

Dichroic Dye dDye

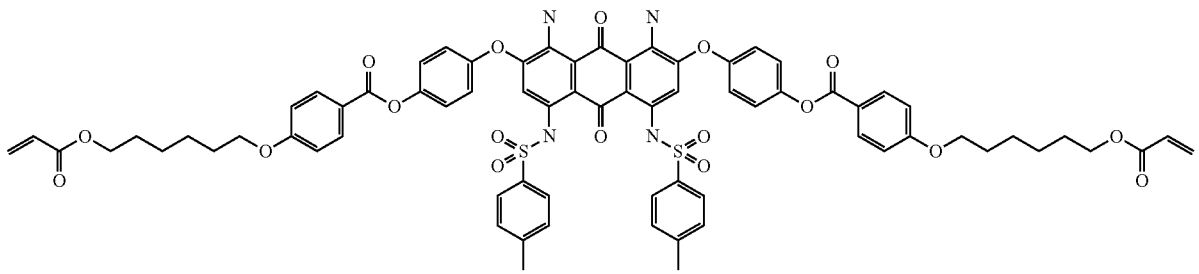 [SMILES: C=CC(=O)OCCCCCCOc1ccc(C(=O)Oc2ccc(Oc3cc(NS(=O)(=O)c4ccc(C)cc4)c4c(c3N)C(=O)c3c(N)c(Oc5ccc(OC(=O)c6ccc(OCCCCCCOC(=O)C=C)cc6)cc5)cc(NS(=O)(=O)c5ccc(C)cc5)c3C4=O)cc2)cc1]

Prepared according to WO2015/177062.

Solutions

S-LCP1

| 33.43 wt % | LCM4 |
|---|---|
| 0.70 wt % | Photoinitiator - Irgacure OXE02 (BASF) |
| 0.70 wt % | Kayarad DPCA-20 (Nippon Kayaku) |
| 0.07 wt % | Tinuvin 123 (BASF) |
| 0.01 wt % | BHT (Aldrich) |
| 0.09 wt % | Tego Flow 300 (Tego Chemi Essen) |
| solvents | |
| 52.00 wt % | Butyl acetate |
| 13.00 wt % | Cyclohexanone (CHN) |

Solution S-LCP1 is prepared by dissolving the substances in the mixture of the solvents and stirring the solution for 30 minutes at room temperature.

S-LCP2 (Horneotropically Aligning LOP)

Substances

| 19.56 wt % | LCM2 |
|---|---|
| 4.89 wt % | LCM3 |
| 0.50 wt % | Irgacure 369 (BASF) |
| 0.05 wt % | BHT (Aldrich) |
| solvents | |
| 60.00 wt % | Methyl Ethyl Ketone (MEK) |
| 15.00 wt % | CHN |

Solution S-LCP2 is prepared by dissolving the substances in the mixture of the solvents and stirring the solution for 30 minutes at room temperature.

S-dLCP

Substances

| 35.12 wt % | LCM6 |
|---|---|
| 4.00 wt % | dDye |

-continued

| | |
|---|---|
| 0.80 wt % | Irgacure 369 (BASF) |
| 0.08 wt % | BHT (Aldrich) |
| solvents | |
| 48.00 wt % | Methyl Ethyl Ketone (MEK) |
| 12.00 wt % | CHN |

Solution S-dLCP is prepared by dissolving the substances in the mixture of the solvents and stirring the solution for 30 minutes at room temperature.

S-cLCP

Substances

| | |
|---|---|
| 14.2 wt % | LCM4 |
| 9.9 wt % | LCM7 |
| 1 wt % | Lumogen S750 (BASF) |
| 0.8 wt % | Irgacure 907 (BASF) |
| 0.06 wt % | Irgafos 168 (BASF) |
| 0.04 wt % | BHT (Aldrich) |
| solvents | |
| 59.2 wt % | Methyl Propyl Ketone |
| 7.4 wt % | Dioxalane |
| 7.4 wt % | CHN |

Solution S-cLCP is prepared by dissolving the substances in the mixture of the solvents and stirring the solution for 30 minutes at room temperature.

S-PAPC1 (PAPC Material)

Substances

| | |
|---|---|
| 9.70 wt % | LCM1 |
| 9.70 wt % | LCM2 |
| 4.80 wt % | LCM3 |
| 0.25 wt % | PA1 |
| 0.50 wt % | Irgacure 369 (BASF) |
| 0.05 wt % | BHT (Aldrich) |
| solvents | |
| 60.00 wt % | MEK |
| 15.00 wt % | CHN |

Solution S-PAPC1 is prepared by dissolving the substances in the mixture of the solvents and stirring the solution for 30 minutes at room temperature.

S-PAPC2 (PAPC Material)

Substances

| | |
|---|---|
| 18.34 wt % | LCM1 |
| 6.11 wt % | LCM3 |
| 0.25 wt % | PA1 |
| 0.50 wt % | Irgacure 369 (BASF) |
| 0.05 wt % | BHT (Aldrich) |
| solvents | |
| 60.00 wt % | MEK |
| 15.00 wt % | CHN |

The solution S-PAPC2 is prepared by dissolving the substances in the mixture of the solvents and stirring the solution for 30 minutes at room temperature.

S-PAPC3

Substances

| | |
|---|---|
| 19.00 wt % | LCM2 |
| 8.10 wt % | LCM5 |
| 0.30 wt % | PA1 |
| 0.55 wt % | Irgacure 369 (BASF) |
| 0.05 wt % | BHT (Aldrich) |
| solvent | |
| 72.00 wt % | MEK |

The solution S-PAPC3 is prepared by dissolving the substances in the solvent MEK and stirring the solution for 30 minutes at room temperature.

Example 1

The surface of a 100 μm Cyclo Olefin Polymer (COP, Zeonor ZF16-100 from Zeon) plastic substrate was activated with an $O_2$ plasma: Power 80% (200 W, 40 kHz), $O_2$ Flow 5 sccm, Time 3 minutes.

The COP substrate was then Kbar coated (bar size 1) with solution S-PAPC1 and annealed for 5 minutes at 50° C. in an oven. The film was then exposed at room temperature to 200 mJ/cm$^2$ linearly polarized UVB light under $N_2$ atmosphere. Then the film was visually observed between crossed polarizers. It was found that when viewing vertical to the substrate the film appeared dark independent from the azimuthal angle of the substrate with regard to the polarizers. However, when observed at oblique angles, the film turned bright. It was concluded that the created film was birefringent with the optical axis vertical to the substrate. Accordingly, the liquid crystals of the mixture were aligned homeotropically.

Solution S-LCP1 was then coated directly onto the PAPC1 layer by means of bar coating (k-bar 1, speed 8) and annealed for 2 minutes at 50° C. in an oven. Finally, the film was crosslinked by exposure to 1.5 J/cm$^2$ UVA light under $N_2$ atmosphere.

The film was then again visually observed between crossed polarizers. It was now found that when viewing vertical to the substrate a uniaxially aligned, birefringent film has been created with a well-defined orientation of the optical axis. By conoscopic observation in a polarizing microscope using a tilting compensator it was found that the optical axis was planar and parallel to the polarization direction of the UVB light that was applied to the PAPC1 layer. It was concluded that orientation was created in the surface of the PAPC1 layer, which aligned the LCP1 liquid crystals along the induced orientation direction.

The created film structure was then further evaluated with a polarimeter (AxoScan, from Axometrics). Both in-plane (R0) and out-of-plane retardance (Rth) of the PAPC1 layer and of the LCP1 layer were extracted from the measurements at 550 nm, with the results Rth=−145 nm and R0=178 nm.

The values R0 and Rth are defined as follows:

$$R0=(n_x-n_y) \times d$$

$$Rth=((n_x+n_y)/2-n_z) \times d,$$

wherein $n_x$, $n_y$ are the refractive indices in the substrate plane, $n_z$ is the refractive index perpendicular to the substrate plane and d is the layer thickness.

Example 2

As in example 1, a plasma treated COP film was used as a substrate. Solution S-PAPC2 was Kbar coated (bar size 1)

on the COP substrate and annealed for 5 minutes at 50° C. in an oven. The film was then at room temperature exposed to 200 mJ/cm$^2$ linearly polarized UVB light under N$_2$ atmosphere. Then the film was visually observed between crossed polarizers. It was found that when viewing vertical to the substrate the film appeared dark independent from the azimuthal angle of the substrate with regard to the polarizers. However, when observed at oblique angles, the film turned bright. It was concluded that the created film was birefringent with the optical axis vertical to the substrate. Accordingly, the liquid crystals of the mixture were aligned homeotropically.

Solution S-LCP1 was then coated directly onto the PAPC2 layer by means of bar coating (k-bar 1, speed 8) and annealed for 2 minutes at 50° C. in an oven. Finally, the film was crosslinked by exposure to 1.5 J/cm$^2$ UVA light under N$_2$ atmosphere.

The film was then again visually observed between crossed polarizers. It was now found that when viewing vertical to the substrate a uniaxially aligned, birefringent film has been created with a well-defined orientation of the optical axis. By conoscopic observation in a polarizing microscope using a tilting compensator it was found that the optical axis was planar and parallel to the polarization direction of the UVB light that was applied to the PAPC2 layer. It was concluded that orientation was created in the surface of the PAPC2 layer, which aligned the LCP1 liquid crystals along the induced orientation direction.

The created film structure was then further evaluated with a polarimeter (AxoScan, from Axometrics). Both in-plane (R0) and out-of-plane retardance (Rth) of the PAPC2 layer and of the LCP1 layer were extracted from the measurements at 550 nm, with the results Rth=−288 nm and R0=178 nm.

Comparative Example 1

As in example 1, a plasma treated COP film was used as a substrate. Solution S-LCP2 was Kbar coated (bar size 1) on the COP substrate and annealed for 5 minutes at 50° C. in an oven. The film was then at room temperature exposed to 200 mJ/cm$^2$ linearly polarized UVB light under N$_2$ atmosphere. Then the film was visually observed between crossed polarizers. It was found that when viewing vertical to the substrate the film appeared dark independent from the azimuthal angle of the substrate with regard to the polarizers. However, when observed at oblique angles, the film turned bright. It was concluded that the created film was birefringent with the optical axis vertical to the substrate. Accordingly, the liquid crystals of the mixture were aligned homeotropically.

The created film was evaluated with a polarimeter (AxoScan, from Axometrics) in order to determine the out-of-plane retardance (Rth) of the LCP2 layer. As a result, a value of Rth=−306 nm was determined.

Solution S-LCP1 was then coated directly onto the LCP2 layer by means of bar coating (k-bar 1, speed 8) and annealed for 2 minutes at 50° C. in an oven. Finally, the film was crosslinked by exposure to 1.5 J/cm$^2$ UVA light under N$_2$ atmosphere.

The film was again visually observed between crossed polarizers. It was now found that the film appeared bright independent from the azimuthal angle of the substrate with regard to the polarizers. But instead of uniaxial orientation, Schlieren texture was observed, which means that no preferred azimuthal orientation was provided by the homeotropic LCP2 layer. Hence, the liquid crystals in the LCP1 layer were not aligned.

Example 3, Patterned Retarder

As in example 1, a plasma treated COP film was used as a substrate. Solution S-PAPC3 was Kbar coated (bar size 1) on the COP substrate and annealed for 5 minutes at 50° C. in an oven.

An alignment pattern was generated in the surface of the PAPC3 layer by a double-step exposure process. In a first step, the PAPC3 layer was exposed to 1000 mJ/cm$^2$ collimated linearly polarized UVB light under N$_2$ atmosphere with the polarization direction at 0° with regard to the reference edge of the substrate through a photomask having an opaque and a transmissive area. In a second step, the PAPC3 layer was exposed to 500 mJ/cm$^2$ collimated linearly polarized UVB light under N$_2$ atmosphere with the polarization direction at 45° with regard to the reference edge of the substrate, without photomask.

Then the film was visually observed between crossed polarizers. It was found that when viewing vertical to the substrate the film appeared dark independent from the azimuthal angle of the substrate with regard to the polarizers. However, when observed at oblique angles, the film turned bright. It was concluded that the created film was birefringent with the optical axis vertical to the substrate. Accordingly, the liquid crystals of the mixture were aligned homeotropically.

On top of the exposed PAPC3 layer, a layer was formed from LCP solution S-LCP1 by KBar coating (bar size 1). The wet film was annealed and dried for 60 seconds at 50° C. in an oven and subsequently crosslinked at room temperature under nitrogen upon irradiation with 1500 mJ/cm$^2$ of the light of a high-pressure mercury lamp. When observing the film through crossed polarizers, it was found to act as a patterned retarder. When rotating the film so that the reference edge of the substrate coincides with the polarization direction of any of the crossed polarizers, the region exposed in the first step appears dark while the other region is bright. When rotating the device by 45°, the appearance of the two regions is inversed: the previously dark region appears now bright and the previously bright region appears now dark.

Example 4, Patterned Polarizer

A PAPC3 layer was coated onto a plasma treated COP, annealed, dried and exposed as in Example 3, except for the polarization directions of the linearly polarized UVB light, which are chosen as 0° and 90° (instead of 0° and 45°).

On top of the exposed PAPC3 layer, a layer was formed from solution S-dLCP by KBar coating (bar size 3). The wet film was annealed and dried for 120 seconds at 95° C. in an oven and subsequently crosslinked at room temperature under nitrogen upon irradiation with 1500 mJ/cm$^2$ of the light of a high-pressure mercury lamp.

When observing the film through a polarizer, it was found to act as a patterned polarizer. When rotating the film so that the reference edge of the substrate coincides with the absorption axis of the polarizer, the region exposed in the first step appears bright while the other region is dark. When rotating the device by 90°, the appearance of the two regions is inversed: the previously dark region appears now bright and the previously bright region appears now dark.

Example 5, Cholesteric Device

As in example 1, a plasma treated COP film was used as a substrate. Solution S-PAPC3 was Kbar coated (bar size 1) on the COP substrate and annealed for 5 minutes at 50° C. in an oven.

The film was exposed at room temperature to 1000 mJ/cm$^2$ linearly polarized UVB light under $N_2$ atmosphere.

On top of the exposed PAPC3 layer, a layer was formed from cholesteric LCP solution S-cLCP by KBar coating (bar size 1). The wet film was annealed and dried for 60 seconds at 99° C. in an oven and subsequently crosslinked at room temperature under nitrogen upon irradiation with 1500 mJ/cm$^2$ of the light of a high-pressure mercury lamp. The film was found to act as a well oriented cholesteric film, exhibiting a blue coloration in reflection. When the film is seen at an oblique incidence, it exhibits a red shift.

The invention and different embodiments can be summarized by the following items:

1. Method of manufacturing an optical element (1, 2) including a photo-aligned positive c-plate retarder layer comprising the steps of
   providing a PAPC material composition comprising homeotropically alignable, polymerizable liquid crystals and a photo-orientable substance
   forming on a support (11) a layer (12) of the PAPC material, wherein the liquid crystal molecules are homeotropically oriented
   initiating polymerization of the polymerizable liquid crystals in the PAPC layer
   exposing the PAPC layer (12) to aligning light to generate alignment on the upper surface of the layer for a slave material, wherein the generated alignment direction at least in one area of the upper surface is planar or tilted with regard to the PAPC layer surface.
2. Method according to item 1, wherein polymerization of the polymerizable liquid crystals is initiated before the PAPC layer (12) is exposed to aligning light.
3. Method according to item 1, wherein polymerization of the polymerizable liquid crystals is initiated after the PAPC layer (12) is exposed to aligning light.
4. Method according to item 1, wherein polymerization of the polymerizable liquid crystals and generation of alignment is initiated in a single step of exposure of the PAPC layer (12) to aligning light.
5. Method according to any preceding item, wherein the photo-orientable substance in the PAPC layer has a density gradient, such that the concentration of photo-orientable substance is higher at the upper surface of the PAPC layer than in the middle of the layer.
6. Method according to any preceding item, wherein the photo-orientable substance comprises fluorinated and/or siloxane moieties and/or is a polysiloxane.
7. Method according to any preceding item, wherein in an additional step a slave material is applied on top of and in direct contact with the PAPC layer.
8. Layer structure (1, 2) including a PAPC layer (12), comprising polymerized liquid crystal monomers which are aligned homeotropically and which provides alignment capability on its surface which is able to align a slave material planar or tilted with regard to the surface of the PAPC layer.
9. Layer structure according to item 8, wherein the photo-orientable substance in the PAPC layer (12) has a density gradient, such that the concentration of photo-orientable substance is higher at the upper surface of the PAPC layer than in the middle of the layer.
10. Layer structure according to item 8 or 9, wherein the photo-orientable substance comprises fluorinated and/or siloxane moieties and/or is a polysiloxane.
11. Layer structure according to any of items 8 to 10, wherein the PAPC material comprises dichroic dyes.
12. Layer structure according to any of items 8 to 11, which has an additional anisotropic layer (13) in direct contact with the PAPC layer, the additional layer comprising liquid crystal polymers, wherein the liquid crystal polymer of the additional layer is aligned according to the alignment information of the PAPC layer.
13. Layer structure according to item 12, wherein the PAPC layer (12) acts as a positive c-plate retarder and the additional layer comprising liquid crystal polymers acts as a planar retarder.
14. Composition comprising homeotropically alignable, polymerizable liquid crystals and a photo-orientable substance, wherein the percentage by weight of photo-orientable substances is less than 5%, less than 1 wt % or even less than 0.1 wt % with regard to the composition without solvents and the photo-orientable substance comprises fluorinated and/or siloxane moieties and/or is a polysiloxane.
15. Composition according to item 14, wherein the photo-orientable substance is a polymer and comprises fluorinated moieties in the side chain.

The invention claimed is:

1. A method of manufacturing an optical element (1, 2) including a photo-aligned positive c-plate retarder layer comprising the steps of
   providing a PAPC material composition comprising homeotropically alignable, polymerizable liquid crystals and a photo-orientable substance
   forming on a support (11) a layer (12) of the PAPC material, wherein the liquid crystal molecules are homeotropically oriented
   initiating polymerization of the polymerizable liquid crystals in the PAPC layer
   exposing the PAPC layer (12) to aligning light to generate alignment on the upper surface of the layer for a slave material, wherein the generated alignment direction at least in one area of the upper surface is planar or tilted with regard to the PAPC layer surface.
2. The method according to claim 1, wherein polymerization of the polymerizable liquid crystals is initiated before the PAPC layer (12) is exposed to aligning light.
3. The method according to claim 1, wherein polymerization of the polymerizable liquid crystals is initiated after the PAPC layer (12) is exposed to aligning light.
4. The method according to claim 1, wherein polymerization of the polymerizable liquid crystals and generation of alignment is initiated in a single step of exposure of the PAPC layer (12) to aligning light.
5. The method according to claim 1, wherein the photo-orientable substance in the PAPC layer has a density gradient, such that the concentration of photo-orientable substance is higher at the upper surface of the PAPC layer than in the middle of the layer.
6. The method according to claim 1, wherein the photo-orientable substance comprises fluorinated and/or siloxane moieties and/or is a polysiloxane.
7. The method according to claim 1, wherein in an additional step a slave material is applied on top of and in direct contact with the PAPC layer.
8. A layer structure (1, 2) including a PAPC layer (12), comprising polymerized liquid crystal monomers which are aligned homeotropically and which provides alignment capability on its surface which is able to align a slave material planar or tilted with regard to the surface of the PAPC layer.

9. The layer structure according to claim 8, wherein the photo-orientable substance in the PAPC layer (12) has a density gradient, such that the concentration of photo-orientable substance is higher at the upper surface of the PAPC layer than in the middle of the layer.

10. The layer structure according to claim 8, wherein the photo-orientable substance comprises fluorinated and/or siloxane moieties and/or is a polysiloxane.

11. The layer structure according to claim 8, wherein the PAPC material comprises dichroic dyes.

12. The layer structure according to claim 8, which has an additional anisotropic layer (13) in direct contact with the PAPC layer, the additional layer comprising liquid crystal polymers, wherein the liquid crystal polymer of the additional layer is aligned according to the alignment information of the PAPC layer.

13. The layer structure according to claim 12, wherein the PAPC layer (12) acts as a positive c-plate retarder and the additional layer comprising liquid crystal polymers acts as a planar retarder.

14. A composition comprising homeotropically alignable, polymerizable liquid crystals and a photo-orientable substance, wherein the percentage by weight of photo-orientable substances is less than 5%, less than 1 wt % or even less than 0.1 wt % with regard to the composition without solvents and the photo-orientable substance comprises fluorinated and/or siloxane moieties and/or is a polysiloxane.

15. The composition according to claim 14, wherein the photo-orientable substance is a polymer and comprises fluorinated moieties in the side chain.

16. The composition according to claim 14, comprising polymerizable liquid crystals which are homeotropically alignable by interaction of the surface of a support and the composition, and a photo-orientable substance, wherein the percentage by weight of photo-orientable substances is less than 5%, less than 1 wt % or even less than 0.1 wt % with regard to the composition without solvents and the photo-orientable substance comprises fluorinated and/or siloxane moieties and/or is a polysiloxane.

17. The composition according to claim 16, wherein the photo-orientable substance is a polymer and comprises fluorinated moieties in the side chain.

* * * * *